Patented Oct. 9, 1945

2,386,363

UNITED STATES PATENT OFFICE 2,386,363

PREPARATION OF ETHYL B-ETHOXY-PROPIONATE

Benjamin L. Souther, New Canaan, Conn., assignor to U. S. Industrial Chemicals, Inc., New York, N. Y., a corporation of Delaware No Drawing. Application November 5, 1943, Serial No. 509,142

1 Claim. (Cl. 260—484)

This invention relates to the manufacture of ethyl B-ethoxypropionate, an intermediate in the preparation of vitamin $B_1$, and particularly to improvements in the method whereby higher yields of a product free from contaminants are obtainable.

Ethyl B-ethoxypropionate is a water white liquid having a boiling point of about 70–72° C. at 24 mm. pressure. It is known that the desired product is obtainable by combined hydrolysis and esterification of B-ethoxypropionitrile as shown by the following reaction:

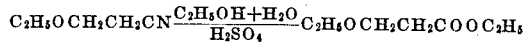

The known procedure is subject to the disadvantage that the product contains a minimum of 2.6% of unconverted nitrile. It is impossible to separate the nitrile from the ester in commercial operations by fractionation because there is a difference of only 2° C. in the boiling points of the two compounds. Since the presence of as little as 2.4% of nitrile in the ester makes the latter useless for the preparation of vitamin $B_1$, the procedure as previously suggested is not adapted for use in the commercial preparation of the desired product.

It is the object of the present invention to provide a method of manufacturing ethyl B-ethoxypropionate which is capable of application in relatively large scale commercial operations to produce high yields of a substantially pure product.

Other objects and advantages of the invention will be apparent upon reference to the following specification, in which the preferred embodiments of the invention are described.

I have discovered that ethyl B-ethoxypropionate may be prepared in substantially pure form by reacting B-ethoxypropionitrile and ethyl alcohol with sulphuric acid under suitable conditions. These conditions require the relatively slow addition of the sulphuric acid to the mixture with constant stirring and the subsequent maintenance of the mixture at a suitable temperature for an extended period of time. Thus the procedure in general depends upon heating a mixture of B-ethoxypropionitrile (1 mol) and absolute ethyl alcohol (1.9–2.5 mols) to a temperature of 80–85° C. To this mixture I add slowly over a period of upward to about 6 hours and with constant stirring a mixture of sulphuric acid (1.0–1.2 mols) and water (1.0–1.2 mols) with constant stirring. During this period the temperature is increased gradually from 80° to about 102° C. Thereafter the mixture is heated at a temperature of from 99° to 105° C. for a period of from 12 to 24 hours.

When the reaction is completed, the mixture is cooled and water is added to dissolve any separated solids. Thereafter the oil and aqueous layers are permitted to separate. The aqueous layer is extracted with a water-immiscible solvent for the ester, and the extracted material is added to the oily layer. Thereafter the oily layer is subjected to an alkaline wash to remove any free acid and thereafter to a water wash. The neutralized oily layer is then dried in any suitable manner and ethyl B-ethoxypropionate is recovered therefrom by distillation.

In the commercial application of the invention, it is not necessary to isolate B-ethoxypropionitrile. Thus, this material may be prepared by treating a mixture of ethyl alcohol containing a small proportion of sodium ethylate with acrylonitrile. A simple procedure is to add to absolute ethyl alcohol approximately .1% by weight of metallic sodium and permit the latter to react with the alcohol. Thereafter acrylonitrile may be added to the alcohol in approximately equal molar proportions and maintained at a temperature of from 30 to 35° C. with continuous stirring until the reaction is complete. The product containing B-ethoxypropionitrile may be used as the basis for further reaction with alcohol and sulphuric acid in the manner previously described.

As an example of the invention, I placed in a one-liter, three-necked, round bottom flask provided with a reflux condenser and a mechanical stirrer and thermometer, 297 grams (3.0 mols) of B-ethoxypropionitrile and 276 grams (6.0 mols) of absolute ethyl alcohol. The mixture was heated by means of an oil bath and maintained thereby at the desired temperature. A mixture of 348 grams of 95.5% sulphuric acid and 46.2 grams of water (this mixture contains 3.45 mols of sulphuric acid and 3.45 mols of water) was added with vigorous stirring over a period of about 6 hours. During this time the temperature of the liquid in the flask was increased from 80 to 102° C. The mixture was then agitated at 100–102° C. for an additional 18 hours, at which time the reaction was complete. The reaction product was cooled to room temperature with continuous stirring with resulting formation of fine crystals. 150 cc. of water was added to dissolve the crystals and 50 cc. of benzene were then added and the mixture well shaken. Upon settling, the aqueous layer was removed by means of a separatory funnel and was further extracted with three portions, each of 50 cc. of benzene.

The benzene extracts were combined and washed first with 50 cc. of water and then with 50 cc. of sodium carbonate solution and finally with 50 cc. of water. The washed benzene solution was dried over anhydrous sodium sulphate, and the benzene removed by distillation under reduced pressure. The residue was distilled at 73–75° C. under 25 mm. pressure, to give 364 grams of high purity ethyl B-ethoxypropionate containing only 0.3% of unchanged nitrile. This corresponds to a yield of 82.8% of ethyl B-ethoxypropionate.

As an example of commercial operation, I placed in a lead-lined jacketed vessel provided with a reflux condenser, mechanical stirrer and thermometer, 1517 grams (33 mols) of absolute alcohol and 1.59 grams of metallic sodium. After the sodium had reacted with the alcohol, 1590 grams (30 mols) of acrylonitrile were slowly added with continuous stirring while the mixture was maintained at a temperature of 30–35° C. Stirring was continued for an hour, and then 2622 grams of absolute ethyl alcohol were added. The mixture was neutralized by adding sufficient sulphuric acid-water mixture—3480 grams of 95.5% sulphuric acid and 453.9 grams of water (33.9 mols of each). The temperature of the liquid was raised to 80° C., and the remainder of the acid-water mixture was added slowly with stirring while the temperature was gradually raised to 97° C. This period consumed approximately six hours. Thereafter the stirring was continued for approximately eighteen hours while the temperature was maintained at 90–103° C. The mixture was then cooled to about room temperature, and the precipitated ammonium acid sulphate dissolved by the addition of two liters of water.

The oily ester layer was separated from the aqueous layer and the latter was extracted three times with benzene. The benzene extract was added to the ester layer and the mixture was washed with water, then with sodium carbonate solution and again with water. After drying, the ester layer was distilled under reduced pressure to give 3285 grams of high purity ethyl B-ethoxypropionate containing only 0.08% by weight of unchanged nitrile.

As indicated by the examples, as hereinbefore described, it is possible, in accordance with the invention, to ensure substantially complete conversion of B-ethoxypropionitrile affording a product which is substantially free from nitrile and thus available for the production of vitamin $B_1$. The operation is simple, easily controllable and reliable, and affords a commercial source of ethyl B-ethoxypropionate which has not been available heretofore.

Various changes may be made in the procedure as described without departing from the invention or sacrificing the advantages thereof.

I claim:

The method of preparing ethyl B-ethoxypropionate which comprises heating a mixture of B-ethoxypropionitrile and absolute ethyl alcohol in the molar proportions of approximately 1 to 2, slowly adding with constant stirring a mixture of sulphuric acid and water of approximately equal molar parts and total molar proportion approximately equal to that of the alcohol, continuing the stirring and heating at a temperature of 99–105° C. for a period of from 12 to 24 hours, cooling the mixture, adding water to dissolve separated solids, separating the oily material, neutralizing the acid in and washing the oily material with water, and separating the B-ethoxypropionate from the oily layer by distillation.

BENJAMIN L. SOUTHER.